(12) United States Patent
Wright

(10) Patent No.: US 10,298,060 B2
(45) Date of Patent: May 21, 2019

(54) INDUCTIVE POWER TRANSFER FOR AEROSPACE FLIGHT SYSTEMS

(71) Applicant: The United States of America as represented by the Administrator of the National Aeronautics and Space Administration, Washington, DC (US)

(72) Inventor: Michael R. Wright, Glen Rock, PA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 212 days.

(21) Appl. No.: 15/265,308

(22) Filed: Sep. 14, 2016

(65) Prior Publication Data

US 2018/0076664 A1 Mar. 15, 2018

(51) Int. Cl.
  *B60L 11/18* (2006.01)
  *H02J 50/10* (2016.01)
  *B64G 1/42* (2006.01)

(52) U.S. Cl.
  CPC .......... *H02J 50/10* (2016.02); *B60L 11/1801* (2013.01); *B60L 2200/10* (2013.01); *B64G 1/42* (2013.01)

(58) Field of Classification Search
  USPC ........................................................ 307/104
  See application file for complete search history.

(56) References Cited

U.S. PATENT DOCUMENTS

| | | | |
|---|---|---|---|
| 6,845,303 B1 * | 1/2005 | Byler .................... | B64D 39/00 244/172.5 |
| 2013/0069625 A1 * | 3/2013 | Gilchrist ................ | G01R 31/40 324/76.11 |
| 2016/0114687 A1 * | 4/2016 | Ichikawa ................ | B60L 5/005 701/22 |
| 2017/0015415 A1 * | 1/2017 | Chan .................... | B64C 39/024 |

\* cited by examiner

*Primary Examiner* — Hal Kaplan
*Assistant Examiner* — Xuan Ly
(74) *Attorney, Agent, or Firm* — Christopher O. Edwards; Bryan A. Geurts; Mark P. Dvorscak

(57) ABSTRACT

An apparatus and method of wirelessly powering an aerospace vehicle while the vehicle is on the ground is provided to solve a problem of supplying electric power for aircraft while idling on taxiways. Present systems typically require fuel-driven auxiliary power units (APU's) to generate electricity. Running APU's to power aircraft while idling requires over 443 million gallons of jet fuel annually at a cost of $1.3 billion dollars. This results in an estimated 4.7 megatons of carbon dioxide emissions annually. At the gate, shore power is provided via hardline connection.

8 Claims, 3 Drawing Sheets

INDUCTIVE POWER TRANSFER FOR AEROSPACE FLIGHT SYSTEMS

BACKGROUND

Field

The aspects of the present disclosure relate to wireless inductive transmission of electrical power, and more particularly, as that technology relates to powering aircraft and spacecraft.

Background

Electric power for aircraft while idling on taxiways typically require fuel-driven auxiliary power units (APU's) to generate electricity. Running APU's to power aircraft while idling requires over 443 million gallons of jet fuel annually at a cost of $1.3 billion dollars. This results in an estimated 4.7 megatons of carbon dioxide emissions annually. At the gate, shore power is provided via hardline connection. This introduces risk to ground crew, particularly during inclement weather and during fueling operations. It also requires approximately 570,000 hours annually at a cost of $8.5 million.

Inductive power transfer (IPT) is currently used on technology from small appliances like electric toothbrushes and cell phones to large diesel-electric locomotives for contactless, high-efficiency battery recharging. Known also as "resonant magnetic coupling" and "focused power," this description refers to IPT for wireless power transfer.

IPT's potential benefits are extensive; however, current IPT technologies, wherein the appliances receiving power may be readily disposed on or near a transmitter, are not suited for use on large aerospace vehicles. This is because IPT requires close proximity between transmitter and receiver since power efficiency drops off significantly beyond a few inches. Thus, a larger and more flexible IPT system may be beneficial for use in large aerospace vehicles which stand to benefit the most from IPT technology.

Additionally, current IPT technologies have generally been confined to battery charging and do not offer the capability for operational power transfer. Further, existing wireless power applications do not involve aerospace vehicles. Thus, applying IPT technology as described herein to power aircraft on the ground and spacecraft on earth, in space, or on extraterrestrial surfaces would be desirable.

SUMMARY

As described herein, the exemplary embodiments overcome one or more of the above or other disadvantages known in the art.

One aspect of the exemplary embodiments relates to wirelessly powering an aerospace vehicle while the vehicle is on the ground. For example, some embodiments of the present invention pertain to an apparatus that is capable of bringing an IPT receiver and an IPT transmitter into a sufficiently close proximity of one another so to allow for wireless powering of significantly larger vehicles.

Another aspect of the disclosed embodiments relates to using a retractable skid to achieve the requisite distance between an IPT receiver on an aircraft and an IPT transmitter on the ground in order to permit wireless power transfer.

Another aspect of the disclosed embodiments relates to using vehicle door frames to achieve the requisite distance between an IPT receiver on the aircraft and an IPT transmitter on the ground-based passenger gangway ("jet bridge") interface, in order to permit wireless power transfer at the gate.

Yet another aspect of the disclosed embodiments relates to using the aircraft's landing gear to realize the requisite distance between an IPT transmitter and an IPT receiver to allow for wireless power transfer without any new deployable devices required.

Yet another aspect of the disclosed embodiments relates to prelaunch powering of spacecraft/payloads on the pad, and powering the launch vehicle itself while on the pad. This can be accomplished via IPT through the vehicle fairing or T-0 umbilical.

Yet another aspect of the disclosed embodiments relates to using IPT on spaceflight separation interfaces (e.g., launch vehicle stages, vehicle-payload interface) instead of physical connectors. This would improve reliability and reduce friction or other physical resistance associated with in-flight separation of connectors.

Yet another aspect of the disclosed embodiments relates to powering space exploration systems on lunar or planetary surfaces. This is a new application of existing IPT technology, whereby surface systems such as rovers, EVA equipment, and science instruments, are powered or charged wirelessly. The advantages include reduced risk of contamination (e.g., dust), reduced surface operations time and increased crew safety by obviating the need for mating electrical connectors.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or material could be used.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION

Some embodiments of the present invention pertain to an inductive power transfer apparatus to achieve contactless transmission of electrical power for use in large aerospace vehicles. Large vehicles such as aircraft and spacecraft may be designed or retrofitted to mount power receivers to allow power pickup within the few inches from transmitters required by current IPT technology.

For aircraft, such retrofitting may accomplish wireless transmission via the vehicle's door frame, the vehicle's landing gear, or a retractable skid on the vehicle. Existing automated positioning technology can be used to align the aircraft with the wireless power transmitter to effect the most efficient power transfer.

For spacecraft on the launch pad, power can be transferred through the payload fairing, using non-conductive material at a small area of the vehicle skin. This obviates the need to power up the vehicle to perform stand-alone spacecraft testing, or to open a vehicle access panel to otherwise power the spacecraft. In addition, IPT for wireless T-0 umbilical power enables contactless and contamination-resistant power interfaces, compared to "fly-away" connectors currently used.

For space vehicle separation interfaces (e.g., launch vehicle stages, vehicle-payload interface), electrical power is currently transferred using physical connectors. This results in friction or other resistive forces that can affect velocity or induce "tip-off." It also requires a physical connection that requires connectors, cabling, brackets, and (in the case of capsules such as Apollo and Orion) an electrical umbilical between the service and command modules. Utilizing an IPT interface would eliminate the need for electrical umbilicals, particularly if used in combination with a typical wireless data interface.

For spaceflight hardware on the lunar or planetary surface, traditional IPT systems can be used for charging portable equipment and rovers to provide safe, reliable, and contamination-resistant power interfaces in these typically dust-intensive environments.

Figure 1:
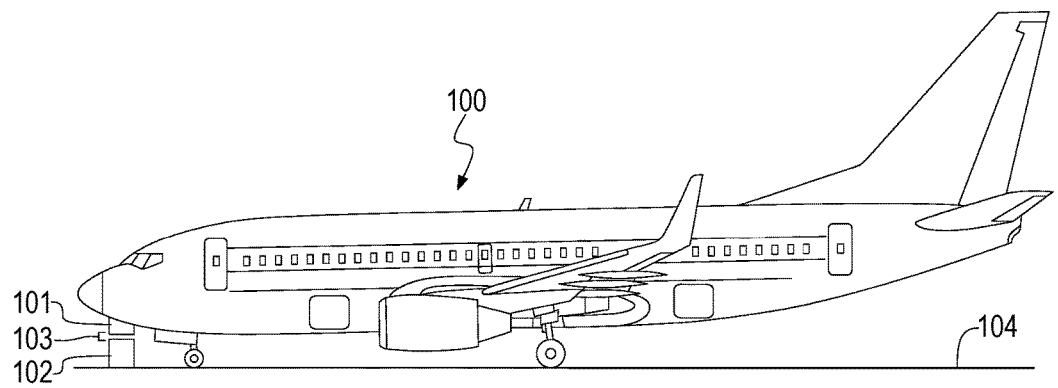
FIG. 1 illustrates an arrangement of the IPT receiver and the IPT transmitter during the charging of the vehicle, according to an embodiment of the present invention.

FIG. 1 illustrates an arrangement of the IPT receiver (101) and the IPT transmitter (102) during the charging of the vehicle (100), according to an embodiment of the present invention. In one embodiment, the IPT receiver (101) is attached to, and electronically coupled with, the vehicle (100). During the powering process, the vehicle (100) will generally be at rest on the ground (104) and the IPT receiver (101) will be located within a close proximity (103) of the IPT transmitter (102). Although the size of a gap (103) between the IPT receiver (101) and the IPT transmitter (102) may vary, the gap (103) will generally be small. A suitable gap (103) may be as small as less than one (1) inch or as large as sixteen (16) inches, with power transfer efficiency falling off with increased distance.

When in operation, power is induced across the gap (103) between the IPT transmitter (102) and the IPT receiver (101). The IPT transmitter (102) may be stationary and located on an area readily accessible by the vehicle (100) such as on the ground (105) at an airport gate or at an airport taxiway. The IPT transmitter (102) may be electronically coupled to a power supply (e.g., utility grid, generator, solar panel, or battery) (106) by a suitable conductor (104).

To transfer power from the IPT transmitter (102) to the IPT receiver (101), the invention relies on the principles of inductive coupling. Inductor coils within the IPT transmitter (102) generate a magnetic field that spans the proximity between the IPT transmitter and the IPT receiver (103). The magnetic field induces an electrical current in the IPT receiver (101) which may then be used to power the vehicle (100).

Figure 2:
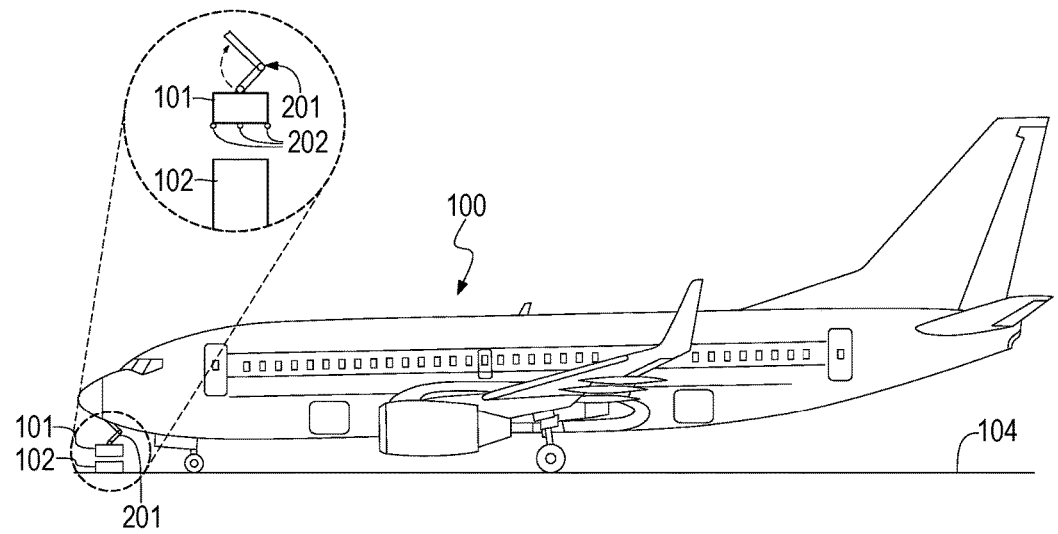
FIG. 2 illustrates a configuration for a retractable skid to raise and lower the IPT receiver, according to an embodiment of the present invention.

FIG. 2 illustrates a configuration for a retractable skid (201) to extend and retract the IPT receiver (101) away from and towards the vehicle (100), according to an embodiment of the present invention. The retractable skid (201) may be extended to bring the IPT receiver (101) closer to the IPT transmitter (102) during powering operations on the ground (104). Conversely, the retractable skid (201) may be retracted to withdraw the IPT receiver (101) towards the safety of the vehicle (100) during flight or when powering operations are not occurring.

Figure 3:
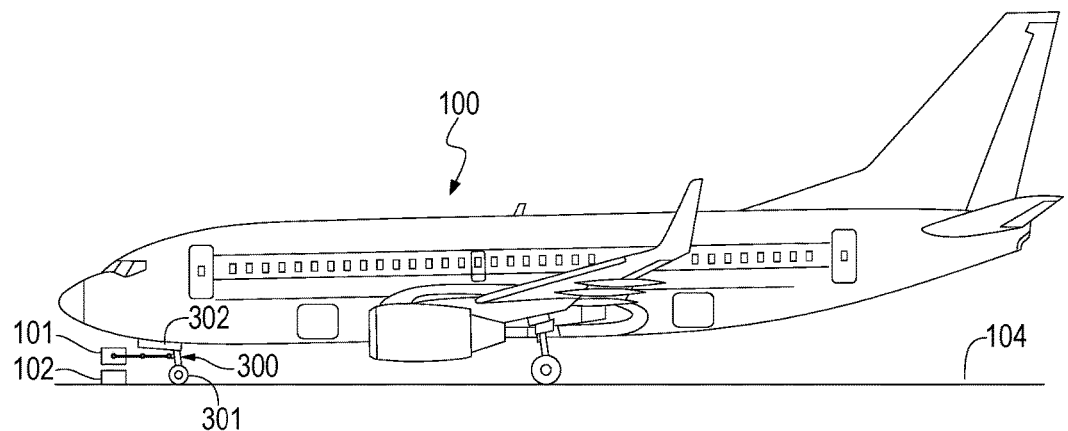
FIG. 3 illustrates a configuration for the IPT receiver coupled to the vehicle's landing gear.

FIG. 3 illustrates a configuration for the IPT receiver (101) coupled to the vehicle's (100) landing gear (300), according to an embodiment of the present invention. This embodiment takes advantage of the vehicle's landing gear (300) as the primary mechanism for moving the IPT receiver (101) closer to an IPT transmitter (102). The IPT receiver (101) is to be placed on the landing gear (300) so as to avoid impeding the landing gear's (300) primary function of enabling the transitions between takeoff and landing. The placement of the IPT receiver (101) must be such that there is proper clearance from the landing gear wheels (301) and proper clearance from the wheel well (302) when in the retracted position. When the landing gear (300) is extended and the vehicle is on the ground, the IPT receiver (101) is accessible by an IPT transmitter (102) and the power transfer process can occur on the ground (104). In this configuration, shore power is transmitted either at a gate or while the vehicle (100) is at a predetermined holdpoint on a taxiway.

Since aircraft follow well-defined and limited translation paths while on the ground, with specific hold points on taxiways, locations of IPT transmitters (102) in the tarmac can be likewise well-defined and limited.

Figure 4:
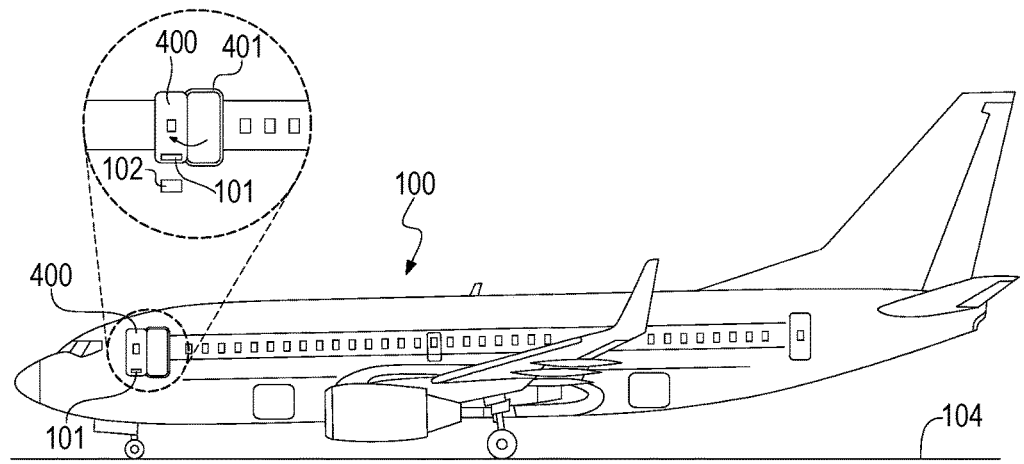
FIG. 4 illustrates a configuration for the IPT receiver coupled to the vehicle's doorway.

FIG. 4 illustrates a configuration for the IPT receiver (101) coupled to the vehicle's (100) door (400), according to an embodiment of the present invention. This embodiment takes advantage of the vehicle's door frame (401) (which interfaces to the jet-bridge) as the primary mechanism for housing the IPT receiver (101). The IPT receiver (101) can also be placed on the door itself (400), so that when the door (400) is opened the IPT receiver (101) may receive power from the IPT transmitter (102) mounted on the jet bridge. In this configuration, shore power is transmitted at an airport gate.

Regardless of the implementation, alignment of the aircraft receiver with the power transmitters to optimize power throughput can be effected by an automatic positioning system. For example, sensors can either control vehicle direction or indicate to the pilot the proper heading and hold point. Fine-adjustment via closed-loop feedback can be automatically made to the receiver once it is in proximity to the transmitter, to effect the most efficient power transfer.

The IPT can be utilized both terrestrially on the ground (104) and in space (503). Using IPT technology, as opposed to traditional hardwire connections for power transfer, reduces risk of failure due to such factors as bent pins and contact contamination. Hardwire power connections are also not optimal for space vehicle interfaces that may require quick or low-force disconnection, such as those on the pad or between vehicle stages and payloads.

Figure 5:
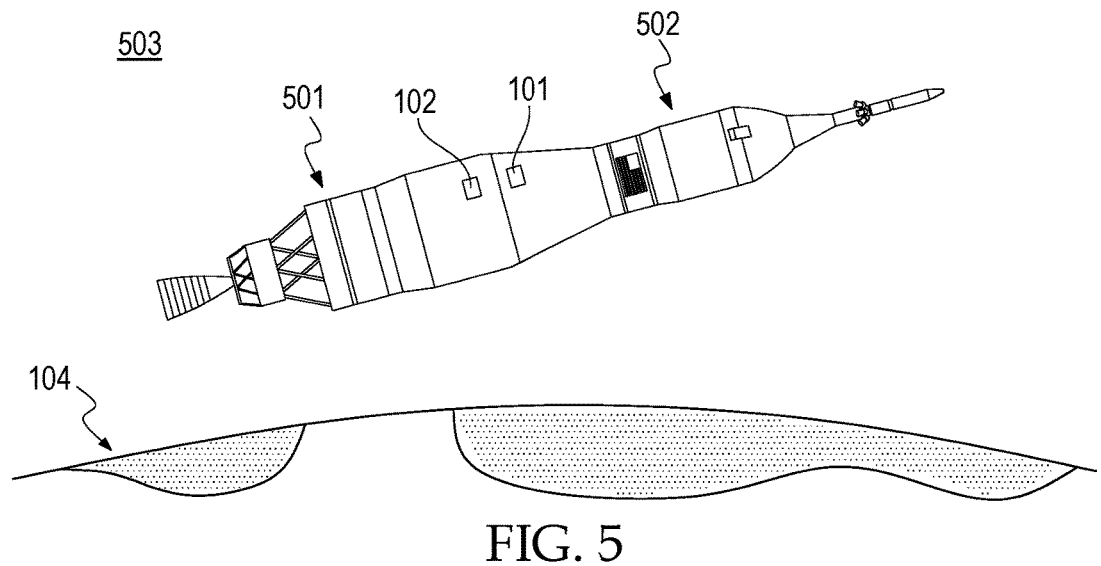
FIG. 5 illustrates a configuration for utilizing IPT to wirelessly transmit power through a spaceflight launch vehicle fairing and spacecraft/payload.
Figure 6:
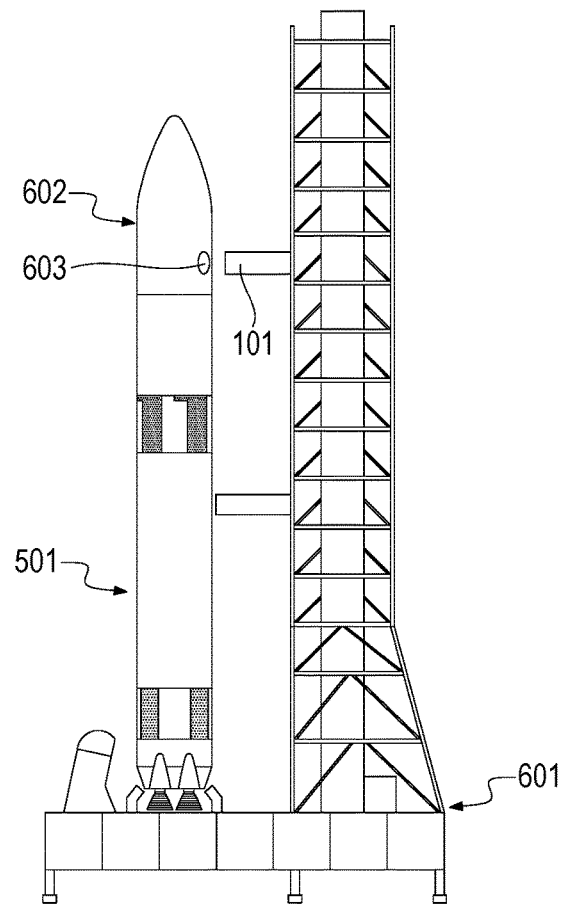
FIG. 6 illustrates a configuration for utilizing IPT to wirelessly transmit power to a stationary spaceflight vehicle on a launch pad via T-0 umbilical.

FIG. 5 illustrates a configuration for wirelessly transmitting power between a spaceflight launch vehicle (501) and space payload (502). The IPT transmitter is on the vehicle upper stage and the IPT receiver is on the spacecraft or payload. This configuration allows for a no-contract, frictionless power interface that eliminates potential failure or "tip-off" during payload separation. It serves as the primary payload power interface to the vehicle.

Besides having power transmitters and receivers transfer only through air, power can be transmitted through structures (e.g., vehicle skin, spacecraft body) by incorporating small "windows" of non-conductive material that are transparent to wireless power.

It is proposed that IPT be used for a wide range of space-based power interfaces, including but not limited to: payload carrier to deployable satellite; launch vehicle stages; space station elements; space suit to suit ports; and other equipment deployed on extraterrestrial surfaces such as rovers and science instruments. Applying IPT, in manners discussed in the embodiments described herein, to extraterrestrial surface systems (e.g., lunar, planetary) would mitigate dust contamination on power connectors, thereby increasing reliability. For human space missions, IPT technology, as discussed in the embodiments contained herein, would also eliminate the need for astronaut crew to handle power connectors during extravehicular activity (EVA) thus increasing crew safety and reducing EVA task time. For telerobotic operations, IPT would eliminate the need to robotically mate connectors which is typically a difficult, time-consuming, and risky operation.

The IPT transmitter (102) is coupled to the launch pad (not shown in initial sketch) and the IPT receiver (101) is coupled to the launch vehicle or payload (502). Such applications could not only fully power the vehicle and spacecraft prior to launch, but also serve for satellite "stand alone" testing on the pad, and operations such as battery charging.

What is claimed is:

1. Apparatus for wirelessly powering a multi-stage space vehicle with an outer conductive skin, from a first space apparatus configured as a first launch vehicle stage to a second space apparatus configured as a second launch vehicle stage comprising:
   (a) a receiver coupled to said multi-stage space vehicle on said second launch vehicle stage;
   (b) a transmitter coupled to a power source on said first launch vehicle stage; and
   (c) multiple windows of non-conductive material embedded within said first and second vehicle launch stages;
   wherein the transmitter is positioned near the receiver while the apparatus is in use and wherein the transmitter wirelessly supplies power to the receiver through inductive power transfer through said outer conductive skin without inducing tip-off and reducing friction during stage separation through use of said windows of non-conductive material during flight.

2. Apparatus of claim 1 wherein the transmitter is positioned within twelve (12) inches of the receiver while the apparatus is in use.

3. Apparatus of claim 1 wherein a retractable device couples the receiver to the multi-stage space vehicle and is movable to position the receiver closer to the transmitter.

4. Apparatus of claim 3 wherein the retractable device comprises a means for detecting the location of the transmitter and subsequently positioning the receiver in such a configuration and location that inductive power transfer between the transmitter and receiver is possible and power transfer is most efficient.

5. Apparatus of claim 1 wherein the receiver is integrated within an area of the multi-stage space vehicle that allows transfer of power through a power-transparent and non-conductive material.

6. Apparatus of claim 5 wherein the receiver is integrated within the forward fuselage, launch vehicle interface, or payload fairing.

7. Apparatus of claim 3 wherein the multi-stage space vehicle is a manned space vehicle.

8. Apparatus of claim 4 wherein the multi-stage space vehicle is an aircraft a manned space vehicle.

* * * * *